United States Patent [19]

Sompel et al.

[11] Patent Number: 5,553,086
[45] Date of Patent: Sep. 3, 1996

[54] MULTIPLE SERVO SECTOR SETS WRITE WITH SELF-VERIFICATION FOR DISK DRIVE

[75] Inventors: Mark A. Sompel, San Jose; William W. Clawson, Tracy; Jason Hong, Cupertino, all of Calif.

[73] Assignee: Quantum Corporation, Milpitas, Calif.

[21] Appl. No.: 187,845

[22] Filed: Jan. 28, 1994

[51] Int. Cl.$^6$ .................................................. H01S 3/19
[52] U.S. Cl. ............................................... 371/47.1
[58] Field of Search .................... 371/47.1, 472; 369/18; 360/26, 36, 38, 47, 53, 51, 48, 87.03, 46, 39

[56] References Cited

U.S. PATENT DOCUMENTS

5,345,342  9/1994  Abbott et al. .......................... 360/48
5,422,760  6/1995  Abbott et al. .......................... 360/46

*Primary Examiner*—Robert W. Beausoliel, Jr.
*Assistant Examiner*—Phung My Chung
*Attorney, Agent, or Firm*—David B. Harrison; John C. Chen

[57] ABSTRACT

Plural embedded servo sector sets are written as a single operation by a servo writer during manufacture of a hard disk drive. Later, the disk drive electronics performs a self scan and selects one good set of embedded servo sectors and erases all other sets, thereby decreasing the number of servo sector rewrites during manufacture and reducing manufacturing time and costs.

10 Claims, 4 Drawing Sheets

MULTIPLE SERVO SECTOR SETS WRITE WITH SELF-VERIFICATION FOR DISK DRIVE

FIELD OF THE INVENTION

The present invention relates to a manufacturing method for manufacturing hard disk drives. More particularly, the present invention relates to methods for writing multiple servo sector sets to a hard disk drive head/disk assembly with a servo writer and subsequently self verifying accuracy of the servo sectors with the completed disk drive.

BACKGROUND OF THE INVENTION

Disk drives conventionally employ head positioning apparatus for rapidly repositioning a data transducer head between concentric data tracks, and for maintaining the head over a selected data track during data reading or writing operations. High capacity, high performance disk drives employ closed loop servo-based head positioners. In some designs, an entire disk surface and a servo data channel are dedicated as overhead to the head positioning process. Increasingly, disk drives employ "embedded servo sectors" which are narrow servo areas or "wedges" which are embedded within each data track.

Typically a data track is divided up into a number of blocks for storing user data. The actual number of data blocks depends upon the size of each block in bytes stored, the radius of the track, the data transfer rate, etc. The embedded servo sectors may follow the data rates of the data blocks, or they may be recorded e.g. at a single rate across the radial extent of the disk, thereby interrupting and splitting fixed length data blocks into segments. One approach followed by the assignee of the present invention, and illustrated in commonly assigned U.S. Pat. No. 5,255,136 entitled "High Capacity Submicro-Winchester Fixed Disk Drive" the disclosure thereof being incorporated herein by reference. The disk drive examples provided in the referenced patent employed embedded fixed-frequency servo sectors which were written by a laser-interferometer servo writer and which split the data blocks into segments.

Laser-interferometer servo writers are well known in fixed disk drive manufacturing. One example of a laser-based servo writer, and a removable mirror fixture which is temporarily mounted on the rotary voice coil actuator of the drive during factory servo writing procedures, is given in commonly assigned U.S. Pat. No. 4,920,442, the disclosure thereof also being incorporated herein by reference. In the described approach, the laser-interferometer servo writer precisely measures head position of the disk drive. Based upon this precisely measured position, which is fed to servo writer electronics essentially implementing the drive servo loop electronics, a voice coil actuator structure of the drive is commanded to move from track to track, while a transducer of the disk drive supported by the voice coil actuator structure actually writes the servo sector patterns to the data storage surface of the disk.

Conventionally, a set of servo sectors is written at a laser interferometer servo writer station on the assembly line at the factory, after the disk drive has been assembled and checked out. Once the set is written, a read back procedure is employed while the disk drive head and disk assembly remains at the servo writer station in order to verify that the servo wedges have validly been written and will be useful by the disk drive head positioner servo loop during subsequent drive operations.

Drives sometimes fail this verification procedure, for a number of reasons including defects in the media, transitory vibrations of the servo writing apparatus, etc. If a drive fails the servo writing process, the process is repeated and another verification is attempted. This rewriting and reverification sequence continues until the drive passes verification, or until, after some finite number of attempts, the drive is declared failed. The repeated attempts to obtain valid servo wedges on the disk drive may consume a considerable amount of time at the servo writer station.

One drawback of laser-based servo writers is that they are very expensive items of capital equipment whose costs are amortized over the number of disk drives which are successfully servo written. The longer it takes to verify valid servo sectors, the more expensive the disk drive becomes, and the more a likelihood of a backup in the manufacturing process, which may also be very costly.

One other drawback of the above approach of verifying the disk drive at the servo writer station is that the servo writer station's electronics must be upgraded to the latest disk drive design, particularly in connection with data transfer rates and drive performance. The need to continually upgrade servo writers with each new disk drive model, or performance enhancement, adds further costs to the servo writer apparatus, and potentially adds delay in ramping production volumes of latest model disk drives.

Accordingly, a hitherto need has remained for a method for effectively reducing the amount of time required, on average, for successful writing of embedded servo sectors to disk drives during manufacture thereof.

SUMMARY OF THE INVENTION WITH OBJECTS

A general object of the present invention is to increase the likelihood that valid servo sectors are written incident to manufacture of a hard disk drive in a manner overcoming limitations and drawbacks of the prior art.

Yet another object of the present invention is to write multiple servo sector sets within the same time interval otherwise required to write a single set of servo sectors with the laser-based servo writer station, and then have the completed disk drive subsequently provide an off-line servo sector verification process.

Another object of the present invention is to have the servo writer station cause multiple sets of servo sectors to be written to the disk drive and also to install diagnostic program routines needed by the disk drive to self scan and verity the accuracy and useability of at least one set of servo sectors and thereafter initialize the drive to its final configuration to the customer or mass storage user. This procedure reduces servo writing time and eliminates a final test station in manufacturing, and manufacturing delay associated in passing the disk drive through the final station.

In accordance with principles of the present invention, a method is provided for reducing the amount of time required for servo writing of embedded servo sectors on a data storage surface of a head/disk assembly of a disk drive using a servo writer during disk drive assembly. The method includes the steps of:

recording a plurality of sets of spaced apart, servo sectors on the data storage surface of the head/disk assembly with a head of the head/disk assembly under positional control of the servo writer, recording servo set identification information with the head in predetermined locations between the sets of servo sectors with the servo writer which indicates at least the number of sets of servo sectors which have been written, removing the head/disk assembly from the servo writer, enclosing the head/disk assembly with a cover, thereby to seal the interior of the head/disk assembly including the head, installing and connecting a drive electronics circuit board to the head/disk assembly following the recording steps, to complete assembly of the disk drive, applying power to the disk drive to cause it to operate, causing the drive to execute a self scan control program routine for synchronizing a head position servo loop to one of the sets of servo sectors, and verifying with the disk drive the said one of the sets of servo sectors until an error is found, in the event that an error is found, resynchronizing the head position servo loop to a next set of servo sectors and verifying with the disk drive the next set of servo sectors, and repeating the steps of resynchronizing and verifying until an errorless set of servo sectors is identified by the disk drive, or until all of the sets of servo sectors have been determined to be defective, and following identification of an errorless set of servo sectors, erasing with the disk drive head all sets of servo sectors other than the identified errorless set.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS In the Drawings.

DETAILED DESCRIPTION OF A PREFERRED EMBODIMENT

Figure 1:
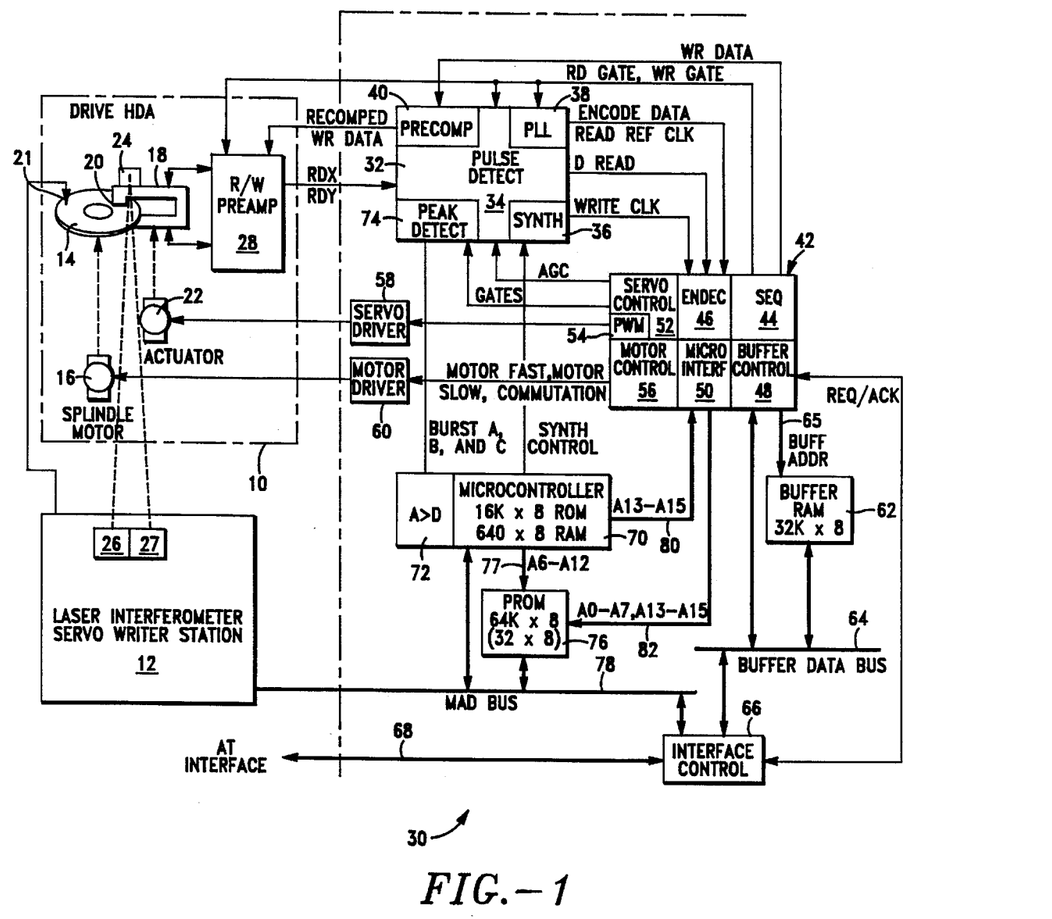
FIG. 1 is a block diagram of a disk drive head/disk assembly mounted at a servo writer station during manufacturing, and being electrically connected to drive electronics.

With reference to FIG. 1, an assembled hard disk drive head/disk assembly (HDA) 10 is mounted at a laser interferometer servo writer station 12 during disk drive manufacturing. The HDA may follow a number of designs and configurations. One presently preferred configuration is substantially as described in commonly assigned U.S. Pat. No. 5,255,136, referred to hereinabove. The HDA 10 includes at least one data storage disk 14 coated with a suitable magnetic storage medium on its major surfaces. The storage disk 14 is rotated at a suitable predetermined rotational velocity, such as within a range from 3600 RPM to 7200 RPM by a DC brushless spindle motor 16. A rotary voice coil actuator structure 18 positions at least one data transducer head 20 relative to its associated data storage surface of the disk 14. An actuator voice coil motor 22 provides the motive force for moving the actuator structure 18 along a limited range of angular displacement relative to the data storage surface of the disk 14.

During the servo writing operation at the servo writer station 12, a mirror fixture 24 is temporarily yet precisely attached to the rotating part of the voice coil actuator structure 18. Either the cover of the HDA 10 is removed, or a suitable slotted aperture is defined in the cover, enabling access to the actuator arm 18 and attachment of the mirror fixture 24. The servo writer station is located in a "clean room" or "clean tunnel" environment, which insures a minimum of particulate contaminants will reach the interior space of the HDA 10.

The mirror fixture 24 is precisely registered with the rotating voice coil actuator structure 18 and deflects a laser beam (identified by the dashed lines) emanating from a source 26 to an interferometer position detector 27 within the servo writer station 12. The servo mirror fixture 24 is similar to the mirror collect described in commonly assigned U.S. Pat. No. 4,920,442, described above, except that it may be attached by a small threaded screw to the rotating actuator arm of the actuator structure 18.

The servo writer station 12 also includes drive electronics 30 which may be substantially the same as on-board drive electronics carried by the completed disk drive. The electronics 30 shown in FIG. 1 includes a read/write channel chip 32 including a pulse detector 34, a frequency synthesizer 36 to support a plurality of data zones as described in the referenced U.S. Pat. No. 5,255,136, a phase locked loop 38, and a write precompensation circuit 40. A peak detector 74 is also included as part of a head positioner servo loop.

The drive electronics 30 also includes a drive electronics ASIC 42. This ASIC 42 includes a data sequencer 44, an encoder/decoder (ENDEC) 46, a buffer controller state machine 48, a microcontroller interface 50, a servo detector circuit 52, a pulse width modulator 54, and a motor control circuit 56. The pulse width modulator 54 provides pulse width modulated control pulses to a servo driver 58 which converts the control pulses into a directional analog driving current which is applied to the actuator motor 22. The motor control circuit 56 supplies motor control signals to a spindle motor driver circuit 60 which supplies e.g. three-phase driving currents to the spindle motor 16.

A solid state RAM buffer 62 is connected to the buffer control 48 and to an interface control circuit 66 via a buffer data bus 64. A buffer address bus 65 extends from the buffer control 48. An interface bus 68, such as one implementing an AT interface convention, enables the drive electronics 30 to be connected to an external computer.

A programmed microcontroller 70 includes an analog to digital converter 72 which is connected to the peak detector 74 of the read/write channel chip 32. Servo bursts of the type described in U.S. Pat. No. 5,255,136 are peak detected by the peak detector 74 and converted into digital values by the converter 72 for further processing by the microcontroller 70 acting within the head positioner servo loop. A programmed read only memory (PROM) 76 is programmed with certain control routines needed for disk drive operations. The PROM 76 is connected to the microcontroller 70 via a microcontroller address/data (MAD) bus 78. High order addresses are directly supplied to the PROM 76 from the microcontroller 70 via a PROM address bus 77. High order addresses are also supplied by a bus 80 from the microcontroller 70 to the microcontroller interface 50 of the drive ASIC 42. The microcontroller interface circuit 50 combines these addresses with latched low order addresses supplied over the bus 78 to the PROM 76 via an address bus 82. Some of the other signal lines needed to control and operate the HDA 12 are also shown in FIG. 1.

It is important to note that the servo writer station 12 is connected to the drive electronics via appropriate connections, such as the MAD bus 78. Also, while at the servo writer station 12, a clock head 21 is disposed in fixed relation to an outer clock track of one rotating data storage surface of the disk 14. The clock head 21 initially writes a clock track to the disk and then subsequently reads the recorded clock track pattern while the head 20 is writing servo sector sets and other information to tracks of the disk 14. The servo writer station uses the clock track in order to establish precise circumferential timing windows for the servo sectors sets in relation to disk rotation, thereby to control accuracy of writing of servo patterns to each surface of the disk.

During servo writing, actual position of the actuator 18 is measured optically by the laser interferometer 27, and measured position is supplied to the microcontroller 70 operating within the head positioning servo loop. In this loop, the microcontroller 70 generates digital values representing commanded head position. These values are provided via the MAD bus 78 and the microcontroller interface 50 to the PWM 54. The PWM 54 generates pulse trains of controlled duty cycle. These pulse trains are then converted to analog values by the servo driver 58 and applied to control the actuator. Thus, during the servo writing operation, the actuator structure 18 may be controllably positioned at each one of a multiplicity of concentric "cylinder" locations ("cylinder" referring to the vertically aligned track positions of all heads of the head stack supported and positioned by the actuator structure 18).

Figure 6:
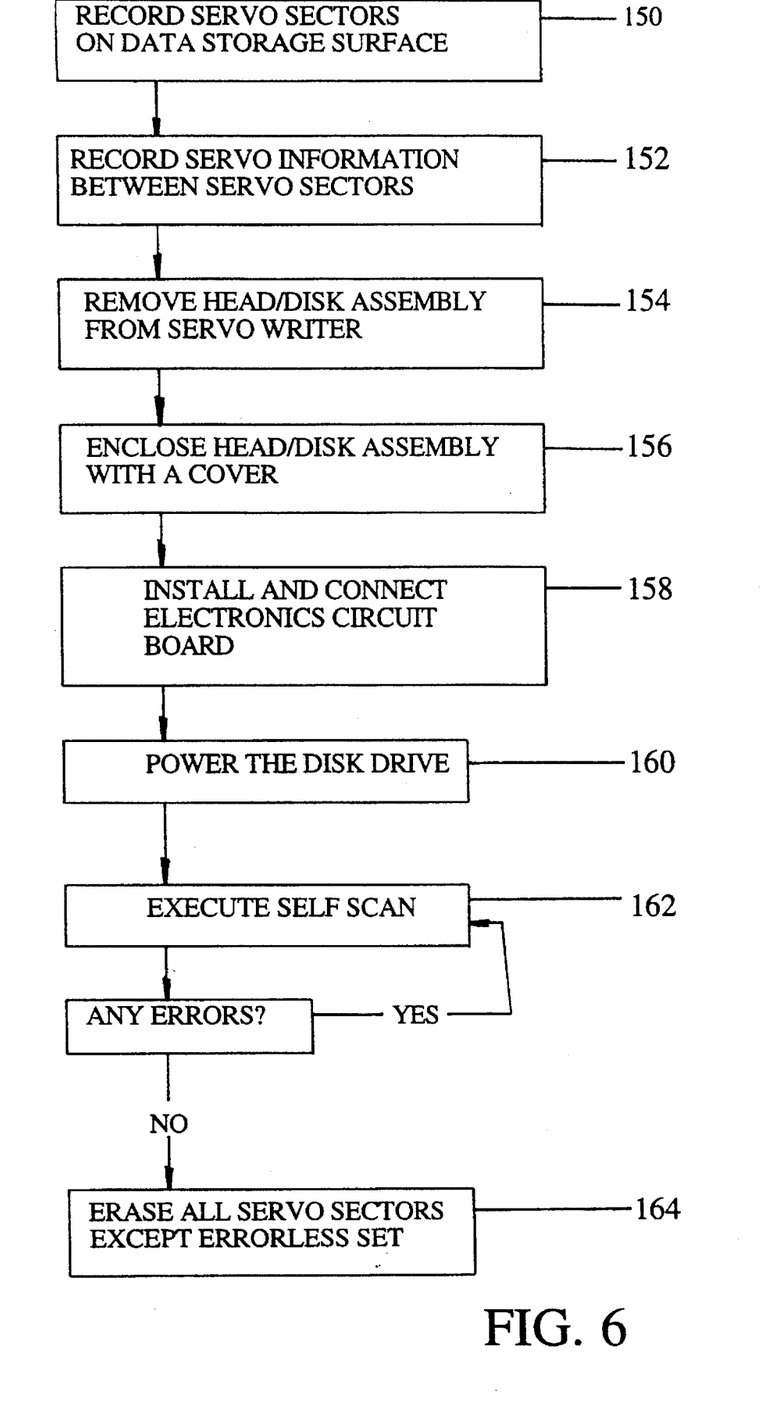
FIG. 6 is a flow chart illustrating the steps for reducing the time required for servo writing embedded servo sectors on data storage surface in accordance with aspects of the present invention.

FIG. 6 provides an overview flow chart illustrating the steps for reducing the time required for servo writing embedded servo sectors on data storage surface in accordance with aspects of the present invention. Each of the steps will be described in detail herein below.

Figure 2:
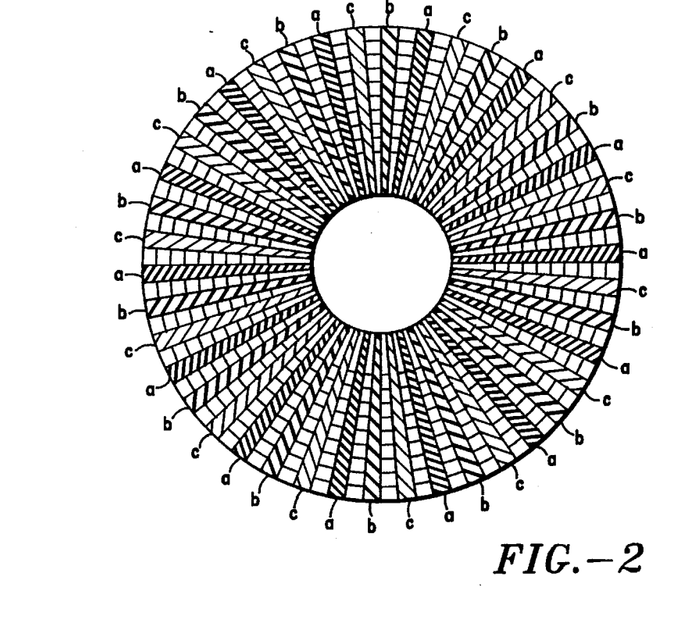
FIG. 2 is a plan view of a disk storage surface of the disk depicted in FIG. 1 after the servo writing of multiple servo sector sets is complete, and before drive self scan.

Referring to FIG. 2, in accordance with aspects of the invention, a plurality of sets of servo patterns are written, there being three sets a, b and c shown in this figure. Each servo set is preferably substantially similar to the servo pattern illustrated and discussed in U.S. Pat. No. 5,255,136 referred to above, and there are e.g. 64 servo sectors written in each servo sector set. These servo sectors or "wedges" are written to each data surface by each head 20 associated therewith during a single servo writing operation commanded at the servo writer station. The servo sector writing procedure is represented by step 150 in FIG. 6.

In addition, certain information useful for drive self scan including an electrical model of a nominal servo template for the particular servo pattern of each set is written in the space between each one of the servo sectors at a selected track location or locations, depending upon the amount of information needed for the subsequent self scan operation carried out by the drive following its final assembly. The servo writing between servo sectors in represented as step 152 in FIG. 6. This information is preferably written on one cylinder at a middle cylinder location, such as "track 700" in a drive having e.g. 1400 tracks per surface. Use of a middle cylinder location, and the medium data transfer rate nominally assigned to the data zone including the middle cylinder location, adds reliability and robustness to the drive self scan operation carried on after completion of servo writing and does not require upgrading of the servo writer to match the latest (and fastest) drive electronics associated with each new model drive to be servo written.

The information written to the tracks of the selected cylinder includes an ID field following the first or "index" servo sector of each set, and a servo self scan program field written after the second to 63rd sectors of the set. The ID field contains information on how many servo wedge sets are written to the drive, and what wedge set is currently being read. For example, the ID field includes at least one byte (and preferably multiple bytes) in which e.g. bits 7-4 contain the number of servo wedge sets recorded on the disk (e.g. 1, 2, 3 or 4), and in which e.g. bits 3-0 provide the wedge set number of the wedge set associated with the particular ID field being read during self scan.

Figure 3A:
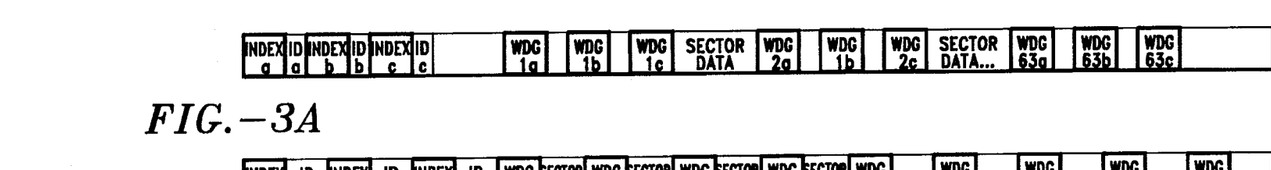
FIG. 3A is one presently preferred track layout for the FIG. 2 disk plan.

FIG. 3A illustrates one presently preferred pattern for writing of the multiple servo wedge sets a, b and c. In the FIG. 3A pattern, the servo sector sets a, b and c are grouped relatively close together, leaving a considerable sector data space available between the grouped sets of servo wedges. This space is then used for writing the drive self scan control software to be used by the disk drive during self scan. Most preferably, this software is written at the servo writer station following completion of the servo wedge writing operation during which the multiple sets of servo wedges are written.

Figure 3B:
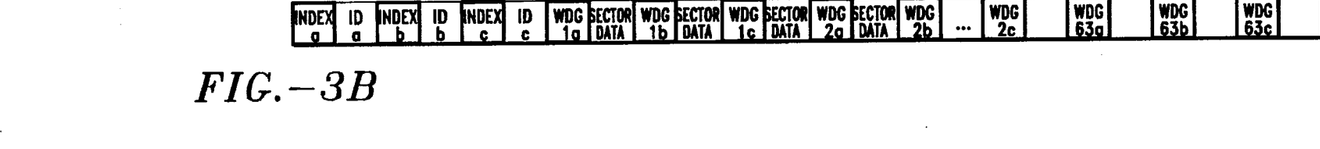
FIG. 3B is another presently preferred track layout for the FIG. 2 disk plan.

FIG. 3B illustrates another presently preferred pattern for writing of the multiple servo wedge sets a, b and c. This pattern more closely follows the recording plan depicted in FIG. 2. In the FIG. 3B pattern, the servo wedges are substantially evenly spaced apart, and duplicate sets of the drive self scan control software are written following each wedge. In other words, at the self scan station following the servo writing station, the disk drive will sync up to one of the servo wedge sets. The actual wedge set may be selected randomly by the disk drive during self scan. Since the self scan control software is duplicated for each wedge set, the drive will be able to read and retrieve the self scan control software from the sector data area immediately following the selected wedge set.

After servo writing and self scan program transfer to the drive HDA 10, represented as step 154 in FIG. 6, is completed at the servo writer station 12, the HDA 10 is removed therefrom, the mirror fixture 24 and clock head 21 are removed, and a cover, or cover seals for closing apertures for the clock head and mirror fixture, are affixed to the HDA 10 in order to seal the interior against particulate contamination in conventional fashion. A printed circuit board e.g. including the electronics 30 (having a predetermined interface convention, such as SCSI, AT, PCMCIA. etc.,) is then mounted to the HDA 10 and connected to the components thereof, substantially in the same manner as shown in FIG. 1 and as represented by step 158 in FIG. 6, in order to complete assembly of the disk drive. The completed disk drive then proceeds to a self scan station.

In its most basic sense, a self scan station includes a power supply connection and a thermal chamber. The completed drive is placed in the thermal chamber, and connected to the power supply. A self scan jumper on the assembled disk drive is set, and power is then applied as represented by step 162 in FIG. 6.

When the drive first powers on at the self scan station following servo writing, the drive servo looks for specific data to start a series of self tests. Servo verify is the first command to run at the self scan station following servo writing. Servo verify will verify at least one good set of servo wedges across the entire surface of each disk 14 of the disk drive. If two or more servo wedge sets are initially written to the drive HDA 10, and a good set is found during the servo verify command of self scan, then the bad or unused set or sets will be erased. If no good set of servo wedges is found, the drive will fail this test and have to be returned to the servo writing station to be rewritten.

Since the system cylinder information is written to the disk drive during servo writing, the servo verify command must also take care of preserving the data during the erasing of the unused set or sets of servo wedges. The data recorded at servo writing is read from the disk and stored in the RAM 62 of the drive's electronics PCB. After the unused servo wedges are erased and the system cylinders of the disk drive are formatted, the system cylinder data stored in the RAM 62 will be written back to reserved system cylinders of the drive, and self scan is completed.

Figure 4:
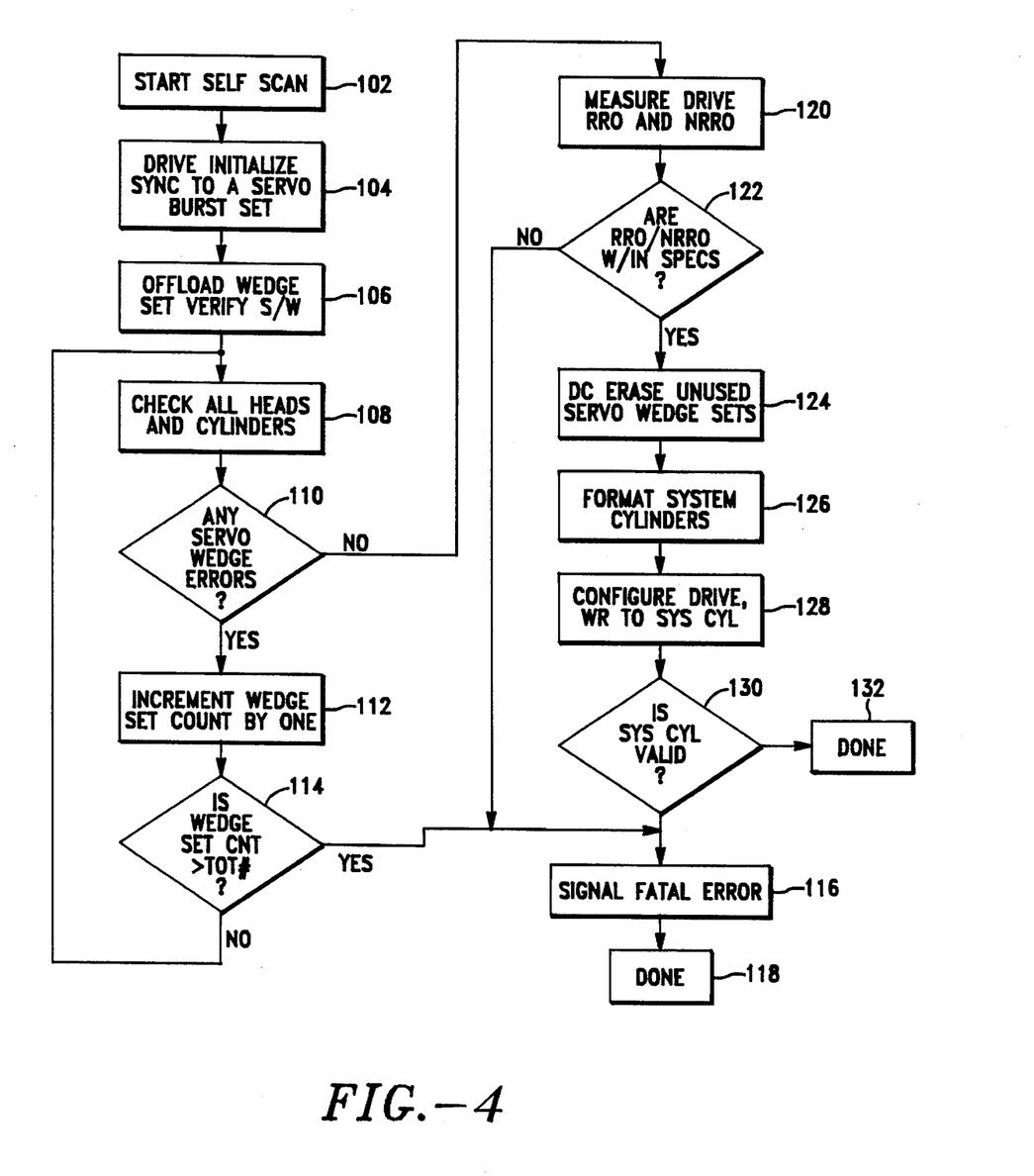
FIG. 4 is flowchart illustrating a drive self scan procedure in accordance with abstracts of the present invention.

FIG. 4 provides an overview flowchart of self scan in accordance with aspects of the present invention. The self scan procedure, represented by steps 162 and 164 in FIG. 6, starts at a process step 102. At a step 104, the drive proceeds with an initialization procedure which causes the spindle motor 16 to rotate the disk to its predetermined operating velocity. Following disk spinup, the actuator structure 18 is commanded to move from an inner landing zone position at which the heads are parked to an outer cylinder location at which system information relating to the disk drive is normally recorded. This cylinder location is typically reserved and unavailable to the ultimate disk drive user. Since the self scan jumper is set manually by an operator before beginning of self scan, the actuator will position the head at track 700 and set the read channel chip 32 to the zone data rate for the data zone including cylinder location 700. The servo detector circuit 52 then establishes timing windows during which a servo sector of a set is captured. Once a servo sector is captured, the servo detector circuit 52 locks to the servo set including the captured servo sector. In the example of FIG. 2, it may be set a, or set b, or set c. The actual set is unimportant at this step, but it is important to know which set is captured by the servo detector circuit 52. This information is read from the ID field of the particular set after the index wedge of the set passes by the head 20.

Once the drive has locked up to a servo wedge set, a step 106 is reached. At step 106 the self scan program information recorded in the sector data areas between the wedges is read and transferred to the drive buffer RAM 62. Each block of the self scan program information carries ECC remainder values, and these values are checked by the ECC circuitry of the drive to verify that the self scan program information being read from the disk is valid. An exemplary on-the-fly ECC circuit and method is described in commonly assigned U.S. Pat. No. 5,241,546, the disclosure thereof being incorporated herein by reference.

Once the self scan program information is transferred into the buffer RAM 62, program execution switches over to that information, in accordance with the teachings found in commonly assigned, copending U.S. patent application Ser. No. 08/056,428 filed on Apr. 30, 1993, entitled: "Shared Memory Array for Data Block and Control Program Storage in Disk Drive ", the disclosure thereof being incorporated herein by reference. The servo verify part of self scan now proceeds, beginning at a step 108.

At step 108, the disk drive proceeds to scan all of the servo wedges of the set written to each of the data storage surfaces, preferably one surface at a time. Single track seeks are carried out to move the head slider 20 from track to track. After each surface is completed, a scan is repeated for a next surface, until all surfaces have been scanned. Each servo wedge contains data used by the servo routine of the drive, and the wedge data read from each servo wedge is compared by the microcontroller 70 against the nominal wedge data electrical template included with the self scan program information recorded in the buffer RAM 62. The template is designed to provide a reasonable tolerance to verify useability of each servo wedge in a set. It sets norms for amplitudes of expected burst edges, and enables verification of the servo address mark, index bit, and track identification field. If these values as read from the disk surface during self scan are within the tolerance established by the electrical template, the servo sector is passed as valid. If a servo wedge is found to contain errors outside of the acceptable tolerance, a bad wedge flag is set to mark the track location of the bad servo sector.

Following completion of the servo wedge scan, a logical node 110 is reached. The logical node 110 determines if servo wedge errors are in excess of a predetermined number have been found (the predetermined number being based upon how many spare data tracks are available to replace the track found to contain a bad servo wedge). If not, a good wedge set is thereby identified, and the servo verify procedure is completed. If excessive servo wedge errors have been found, a step 112 causes a servo wedge set count to be incremented by one. The servo wedge set count e.g. begins with a count of one, and a maximum wedge set count is obtained by the self scan firmware from detection of the ID field following the servo index wedge which indicates how many servo wedge sets have been written by the servo writer. For example, if three servo wedge sets have been recorded, as per FIG. 3A or FIG. 3B, the maximum servo wedge set count is three.

Next, a logical node 114 determines if the servo wedge set count is greater than the maximum wedge set count. If not, the self scan control program causes the servo control and timing circuit 52 to slip its servo wedge timing window to lock to the next servo wedge set, and servo wedge verify returns to the step 108. If the servo wedge set count exceeds the maximum wedge set count, meaning that all available servo wedge sets have been tested and found to include defects, a fatal error condition has occurred, and a step 116 causes the disk drive to signal a fatal error condition at the self scan station. Incident to the step 116, a report is recorded in a system cylinder location of the disk drive specifying the locations of servo wedge errors or other fatal error conditions, so that subsequent failure analysis may determine the cause and location of the detected failures. The self scan program then reaches a done node 118 which results in spin down and power down of the disk drive and a signal to an operator that the drive has failed self scan.

Once an error free servo wedge set is located, as tested at the logical node 110, self scan proceeds to a next process, such as measurement of disk spindle repeatable run out (RRO) and disk spindle non repeatable runout (NRRO) at a step 120. RRO and NRRO are measured by measuring track following errors at each of the e.g. 64 servo sectors during repeated revolutions of the disk 14. If RRO or NRRO are within acceptable limits, as tested at a node 122, self scan proceeds to a step 124 at which the unselected servo wedge sets are DC erased by the head 20. This step removes the unused servo wedge sets from the drive and flees up space for the disk drive format. A step 126 then formats the system cylinders, and may also format all cylinders of the disk drive, if desired. Also, the drive configuration parameters, and preferably the drive control program, software is written from the buffer RAM 62 to system cylinders of the drive at a step 128. (By having the disk drive control program recorded as "diskware" on the system disks, the need for the external program PROM 76 is eliminated, thereby reducing the cost of the disk drive).

Multiple copies of the drive control software are preferably written to the system cylinders. The system cylinders are then read back and their contents verified using conventional ECC techniques. A logical node 130 then determines if the drive control software is validly written and read back from the drive. If so, self scan is done (other than perhaps for conventional thermal cycling (burn in) procedures) and a done node 132 is reached. If the contents of the system cylinders contain uncorrectable errors, or excessive errors, as tested at a logical node 130, the step 116 is reached, and a fatal error is signaled.

Figure 5:
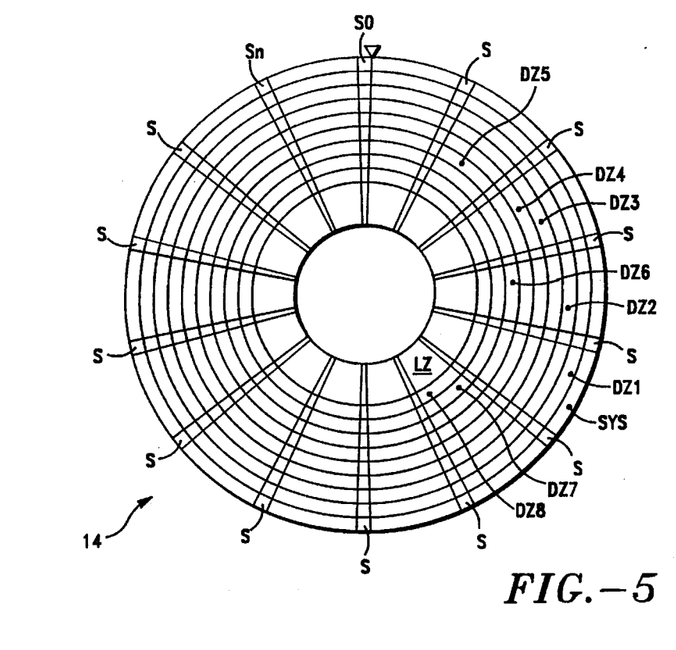
FIG. 5 is a plan view of the disk storage surface of the disk depicted in FIG. 1 following completion of servo writing, self scan and drive configuration.

Following successful completion of self scan, a conventional disk plan layout, as illustrated by FIG. 5 is realized. In this plan, a single set of e.g. 64 servo sectors S, including an index sector SO, is recorded on each disk surface. In this example, an outermost region SYS contains the system cylinders which are unavailable to the mass storage user, but which are used by the disk drive. A predetermined number of data zones, each having a data transfer rate adapted to disk radius, are provided for storage of user data, in accordance with the teachings of the referenced U.S. Pat. No. 5,255,136. Eight exemplary data zones DZ1-DZ8 are shown in FIG. 5. In practice, more zones are preferred. An innermost landing zone region LZ is provided for parking the heads 20 when the disks 14 are not rotating in accordance with conventional contact start-stop techniques.

Thus, it will be appreciated that a number of advantages are achieved by temporarily providing multiple sets of servo wedges during disk drive manufacturing. First, by transferring servo wedge verify to the self scan station, the time required for servo writing is substantially reduced. It takes no more time to write multiple servo wedge sets on the disk than it takes to write a single set. Servo writers are very expensive capital equipment items, and may cost as much as $160,000.00 per unit, or more. By reducing servo writing time, bottlenecks otherwise occurring at the expensive servo writer are reduced.

Another advantage is that the servo writer electronics need not updated with each improvement in disk drive design, providing the electronics are capable of transferring data at the average data transfer rate associated with the central cylinder locations of the disk. (The servo data transfer rate is typically selected to be well below the maximum data transfer rate, so that the servo information remains very robust and reliable).

By providing two sets of servo wedges, the number of disk drives rejected for servo wedge errors will fall from about ten percent (with a single wedge set) to one percent. By providing three sets of servo wedges, the expected number of disk drive failures resulting from bad wedges drops to one tenth of one percent. Thus, the need to rewrite servo wedges to a drive during manufacturing is significantly reduced.

Having thus described an embodiment of the invention, it will now be appreciated that the objects of the invention have been fully achieved, and it will be understood by those skilled in the art that many changes in construction and widely differing embodiments and applications or the invention will suggest themselves without departing from the spirit and scope of the invention. The disclosure and the description herein are purely illustrative and are not intended to be in any sense limiting.

What is claimed is:

1. A method for reducing time required for servo writing of embedded servo sectors on a data storage surface of a head/disk assembly of a disk drive using a servo writer during disk drive assembly, comprising the steps of:

recording a plurality of sets of spaced apart servo sectors on the data storage surface of the head/disk assembly with a head of the head/disk assembly under positional control of the servo writer, recording servo set identification information with the head in predetermined locations between the sets of servo sectors with the servo writer which indicates at least the plurality of sets of servo sectors which have been written, removing the head/disk assembly from the servo writer, enclosing the head/disk assembly with a cover, thereby to seal the interior of the head/disk assembly including the head, installing and connecting a drive electronics circuit board to the head/disk assembly following the recording steps, to complete assembly of the disk drive, applying power to the disk drive to cause the disk drive to operate, causing the drive to execute a self scan control program routine for synchronizing a head position servo loop to one of the sets of servo sectors, and verifying with the disk drive the said one of the sets of servo sectors until an error is found, in the event that an error is found, resynchronizing the head position servo loop to a next set of servo sectors and verifying with the disk drive the next set of servo sectors, repeating the steps of resynchronizing and verifying until an errorless set of servo sectors is identified by the disk drive, or until all of the sets of servo sectors have been determined to be defective, and following identification of an errorless set of servo sectors, erasing with the disk drive head all sets of servo sectors other than the identified errorless set.

2. The method set forth in claim 1 wherein the step of recording a plurality of sets of spaced apart servo sectors comprises the step of writing two sets of servo sectors.

3. The method set forth in claim 1 wherein the step of recording a plurality of sets of spaced apart servo sectors comprises the step of writing three sets of servo sectors.

4. The method set forth in claim 1 wherein the plural sets of servo sectors are adjacently recorded to one another and a sector data field is defined between the adjacent ones of the servo sectors of the plural sets.

5. The method set forth in claim 1 wherein the plural sets of servo sectors are evenly spaced apart, and sector data fields are defined between adjacent sectors of different sets.

6. The method set forth in claim 1 comprising the further step of writing information comprising an electrical template of a nominal usable servo sector set in one or more of the sector data fields, and wherein the verifying step includes the steps of transferring the electrical template from the disk sector data fields to a memory and comparing actual electrical signals read back from the disk with the electrical template.

7. The method set forth in claim 1 comprising the further step of transferring at least one copy of a system program to one or more of the disk sector data fields incident to writing of servo sector sets, and comprising the further steps of reading the at least one copy of the system program from the disk to local memory during the self scan control program, and writing the at least one copy of the system program to a reserved system cylinder location following the erasing step.

8. The method set forth in claim 1 wherein the step of executing a self scan program includes the step of checking for repeatable disk spindle runout errors following the erasing step.

9. The method set forth in claim 1 wherein the step of executing a self scan program includes the step of checking for non repeatable disk spindle runout errors following the erasing step.

10. The method set forth in claim 1 comprising the further step of recording onto the disk an error record in the event that all sets of servo sectors are determined to be defective, the record including a map of locations of servo sector or other fatal errors detected during the self scan step.

* * * * *